United States Patent Office 2,771,450
Patented Nov. 20, 1956

2,771,450

PROCESS FOR BREAKING EMULSIONS

Melvin De Groote, University City, and Bernhard Keiser, Webster Groves, Mo., assignors to Petrolite Corporation, Wilmington, Del., a corporation of Delaware No Drawing. Application April 4, 1955,
Serial No. 499,197

7 Claims. (Cl. 252—341)

The present invention relates to processes or procedures particularly adapted for preventing, breaking or resolving emulsions of the water-in-oil type and particularly petroleum emulsions.

Our invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of signiifcant value in removing impurities particularly inorganic salts, from pipeline oil.

Attention is directed to our co-pending application Serial No. 499,196, filed April 4, 1955. In its broadest aspect said co-pending application is concerned with a quaternary ammonium compound of the structure

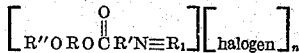

in which $n$ is a small whole number not over 4, and ORO is the residue of the oxyethylated polypropylene glycol $$HO-(C_2H_4O)_x(C_3H_6O)_y(C_2H_4O)_{x'}-H$$

where $(C_3H_6O)_y$ equals at least 10, and $(C_2H_4O)_{x+x'}$ equals 10-90% of the total weight of the compound, the molecular weight being within the range of approximately 800 to approximately 10,000, and

is the radical of the halogenated monocarboxy acid

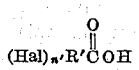

having not over 18 carbon atoms in which $n'$ is a small whole number not over 2 and the halogen atom is substituted in the alpha carbon position, and $N\equiv R_1$ is the radical of the free tertiary amine $N\equiv R_1$ in which $R_1$ represents not over 3 organic radicals which collectively satisfy the trivalent nitrogen valency, and $R''$ is a member of the class selected from hydrogen and

in which the characters have their previous significance.
We have found that at least one sub-genus of the broad genus described in our co-pending application, Serial No. 499,196 filed April 4, 1955, is particularly valuable for the resolution of petroleum emulsions. Thus, the present invention is differentiated from the invention of our co-pending application Serial No. 499,196, in that it is concerned with the use of a more narrow class of compound described therein, for the specific purpose of resolving petroleum emulsions.

More specifically the present invention is concerned with a process for breaking petroleum emulsions of the water-in-oil type characterized by subjecting the emulsion to the action of a demulsifier including a quaternary ammonium compound of the structure

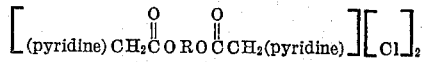

in which ORO is the residue of the oxyethylated polypropyleneglycol

where $(C_3H_6O)_y$ equals approximately 40% to 60%, and $(C_2H_4O)_{x+x'}$ equals approximately 60% to 40% of the total weight of the compound, the molecular weight being within the range of approximately 2,000 to 4,000.

Much of the present text is approximately the same or in some ways a narrow description of the same subject matter as appears in aforementioned co-pending application, Serial No. 499,196, filed April 4, 1955.

For purpose of convenience, what is said hereinafter is divided into four parts:

Part 1 is concerned with the two initial reactants and their preparation, i. e., polyalkyleneglycols and the halogenated monocarboxy acid which in this instance is limited to monochloroacetic acid;

Part 2 is concerned with the preparation of esters by reaction between the two classes of reactants previously noted, i. e., the glycol and the acid;

Part 3 is concerned with the conversion of the ester by means of pyridine into a diquaternary compound, and Part 4 is concerned with the use of such compounds and the resolution of petroleum emulsions of the water-in-oil type.

PART 1

The preparation of the polyalkyleneglycols which are used as initial reactants, can be a continuous process in which water, propyleneglycol, or low molal propyleneglycol is oxypropylated by means of any suitable catalyst, either acid or alkaline, and then subjected to oxyethylation. Instead of being a single step process, one may employ a two-step process in which oxypropylation takes place first and then oxyethylation. If desired, one can simply purchase a suitable polypropyleneglycol from any one of a number of sources and subject the product to oxyethylation as hereinafter specified. If desired, one can purchase the oxyethylated propyleneglycols in the open market and thus the first step is merely esterification, followed by the second step which involves conversion into a quaternary ammonium compound.

As has been stated previously, the polyalkyleneglycols employed are reactants obtained by the oxyethylation of polypropyleneglycol. In a general way, the composition of such polyalkyleneglycol is such that the molecular weight range varies from 2,000 to approximately 4,000. The amount of ethylene oxide present in the compound as compared with the oxypropyleneglycol, varies from 10% to 20% up to approximately 80% to 90%. Indeed, this is the generally accepted procedure for the characterization of such product. Thus the table employed by one manufacturer is as follows in which the X marks indicate products regularly available and those available in carload or large quantities appear with specific designations other than an X mark.

TABLE I.—NOMENCLATURE OF OXYETHYLATED POLYPROPYLENEGLYCOLS
ETHYLENE OXIDE IN MOLECULE, PERCENT

| Second digit | | 0-10 (0) | 10-20 (1) | 20-30 (2) | 30-40 (3) | 40-50 (4) | 50-60 (5) | 60-70 (6) | 70-80 (7) | 80-90 (8) | 90-99 (9) |
|---|---|---|---|---|---|---|---|---|---|---|---|
| Molecular weight of base unit | First digit | | | | | | | | | | |
| Less than 600 | (1) | | | | | | | | | | |
| 601–800 | (2) | | | | | | | | | | |
| 801–1,000 | (3) | | X | | X | | X | | | X | |
| 1,001–1,200 | (4) | | | X | | L44 | | | X | | |
| 1,201–1,500 | (5) | | | | | | | | | | |
| 1,501–1,800 | (6) | | L61 | L62 | | L64 | X | | | | |
| 1,801–2,100 | (7) | | | X | | L74 | X | | L77 | | |
| 2,101–2,500 | (8) | | X | | | L84 | | | | L87 | L88 |
| More than 2,500 | (9) | | | | | | | | | | |

The manufacture of ethyleneglycol, polyethyleneglycol, propyleneglycol, polypropyleneglycol, and oxyethylated polypropyleneglycol, is well known. One procedure, of course, is to simply oxypropylate water so as to obtain the polypropyleneglycol of the desired molecular weight, for instance, in the range of 1,000 or 1,200 or thereabouts, to approximately 2,500, or 3,000, and then to oxyethylate so as to obtain an oxyethylated polypropyleneglycol coming within the indicated range.

However, one need not start with water and one may start with a low molal water-soluble glycol, for instance, propylene, dipropylene or tripropyleneglycol.

If desired, one may purchase the polypropyleneglycol in the open market. For instance, one manufacturer regularly manufactures polypropyleneglycol within the following three molecular weight classes, to wit, 400–450; 975–1075; and 1050–2100. Higher molecular weights are available also, as for example, at least one product having a molecular weight of approximately 2750 or thereabouts. There are also being offered currently polypropyleneglycols having molecular weights of approximately 3000 and 4000. Thus, if desired one can purchase a suitable polypropyleneglycol and not resort to oxypropylation at all. All that is required is to oxyethylate the polypropyleneglycol obtained in the open market or prepared to specification.

It is not believed that any description of the manufacture of such products is required but purely for purpose of illustration reference is made to U. S. Patent No. 2,674,619, dated April 6, 1954, to Lundsted. In said patent there is a characterization of such products in the following language:

"18. Compounds having improved detergent properties, according to the formula

HO—(C₂H₄O)ₓ(C₃H₆O)ᵧ(C₂H₄O)ₓ'—H where y equals at least 15; and (C₂H₄O)ₓ₊ₓ' equals 20–90% of the total weight of the compound."

For reasons which have been stated previously two or three different manufacturers may furnish a polypropyleneglycol 1200 or 1500, or 2000, or even 3000 or 4000, or the like, and although substantially the same there is a slight variation in composition. The reason is due to at least two factors. As pointed out previously one does not get a single product but one obtains cogeneric mixtures whose average composition corresponds to the molecular weight indicated. For instance, one manufacturer of a polypropyleneglycol whose average molecular weight is 1025 states the molecular weight in fact varies from 975 to 1075 and, similarly in the case of a product whose average molecular weight is 2025 the variation runs from 1950 to 2100. Depending on the catalyst used, the rate of reaction and other factors the variation may be even somewhat wider, for instance, 1025 to 1125 in one case, and 1900 and 2150 in another case. The other factor is one that has been pointed out a number of times and particularly in a series of articles dealing with derivatives of propylene oxide. See "Les Derives de l'Oxyde de Propylene," parts I, II and III, Industrie Chimique, volume 40, 1953, pages 221–9, 249–58, and 281–6.

Since propyleneglycol has both a primary alcohol and a secondary alcohol radical and since one can look upon polypropyleneglycols as polymeric linear condensation derivatives of propyleneglycol it is obvious one could obtain head-to-head polymerization, tail-to-tail polymerization, and head-to-tail polymerization. This simply means the equivalent of etherization involving 2 primary hydroxyl groups or 2 secondary hydroxyl groups, or a primary and a secondary hydroxyl group. This is illustrated by the fact that there are three dipropyleneglycols. If one goes to tripropyleneglycol there are theoretically at least eight possibilities. In the higher polypropyleneglycols these possibilities increase enormously. Thus, the first variation is in the molecular weight size which determines the average molecular weight and the second variation is concerned with the fact that dependent on the method of oxypropylation employed, and various factors such as catalyst used, temperature, pressure, speed of reaction, etc., there may be variations in the actual structure. For this reason solubility in water must be interpreted in light of such fact and, thus, although polypropyleneglycol of an average molecular weight of 1,000 or thereabouts may show solubility of about 1.5% in water actually this may be the solubility of some of the low molal cogeners. Thus, it is customary to consider polypropyleneglycols having a molecular weight of 1,000 or more as being substantially water-insoluble. Such customary use is herein included. Even if the molecular weight is double, up to 2000 or thereabouts, there may even be a trace of the glycol which is water soluble, for instance, somewhere in the neighborhood of .015%.

In subsequent Table 2 the polypropyleneglycols obtained varied in molecular weight from approximately 1100 to 3600. They were obtained as the equivalent of reacting one mole of water with 18 moles, 20 moles, 24 moles, 28 moles, 32 moles, 38 moles, 42 moles, 46 moles, and 59 moles of propyleneoxide. They were then reacted with small amounts of ethylene oxide; in some cases one to four moles, in other cases two to five moles, or three to six moles, five to seven moles, and in other instances as many as 15 moles of ethylene oxide. Table 2 gives the data in complete form covering these oxyethylated polypropyleneglycols which were obtained by conventional procedures using an alkaline catalyst. The molecular weight, including the initial mole of water, is shown and also the percentage of the two oxides ignoring the initial moles of water.

TABLE II

| Ex. No. | Propylene oxide, moles | Ethylene oxide, moles | Molec. wt. contributed by PrO | Molec. wt. contributed by EtO | Ignoring initial mole of water | | Molec. wt. including 1 mole water |
|---|---|---|---|---|---|---|---|
| | | | | | Percent PrO | Percent EtO | |
| 1a | 18 | 1 | 1,044 | 44 | 95.96 | 4.04 | 1,106 |
| 2a | 18 | 2 | 1,044 | 88 | 92.23 | 7.77 | 1,150 |
| 3a | 18 | 3 | 1,044 | 132 | 88.77 | 11.23 | 1,194 |
| 4a | 18 | 4 | 1,044 | 176 | 85.58 | 14.42 | 1,238 |
| 5a | 20 | 1 | 1,160 | 44 | 96.35 | 3.65 | 1,222 |
| 6a | 20 | 2 | 1,160 | 88 | 92.95 | 7.05 | 1,266 |
| 7a | 20 | 3 | 1,160 | 132 | 89.79 | 10.21 | 1,310 |
| 8a | 20 | 4 | 1,160 | 176 | 86.82 | 13.18 | 1,354 |
| 9a | 24 | 2 | 1,392 | 88 | 94.05 | 5.95 | 1,498 |
| 10a | 24 | 3 | 1,392 | 132 | 91.34 | 8.66 | 1,542 |
| 11a | 24 | 4 | 1,392 | 176 | 88.77 | 11.23 | 1,586 |
| 12a | 24 | 5 | 1,392 | 220 | 86.35 | 13.65 | 1,630 |
| 13a | 28 | 2 | 1,624 | 88 | 94.87 | 5.13 | 1,730 |
| 14a | 28 | 3 | 1,624 | 132 | 92.48 | 7.52 | 1,776 |
| 15a | 28 | 4 | 1,624 | 176 | 90.22 | 9.78 | 1,820 |
| 16a | 28 | 5 | 1,624 | 220 | 88.09 | 11.91 | 1,864 |
| 17a | 32 | 3 | 1,856 | 132 | 93.36 | 6.64 | 2,006 |
| 18a | 32 | 4 | 1,856 | 176 | 91.33 | 8.67 | 2,050 |
| 19a | 32 | 5 | 1,856 | 220 | 89.40 | 10.60 | 2,096 |
| 20a | 32 | 6 | 1,856 | 264 | 87.57 | 12.43 | 2,140 |
| 21a | 38 | 4 | 2,204 | 176 | 92.60 | 7.40 | 2,398 |
| 22a | 38 | 5 | 2,204 | 220 | 90.93 | 9.07 | 2,442 |
| 23a | 38 | 6 | 2,204 | 264 | 89.30 | 10.70 | 2,486 |
| 24a | 38 | 7 | 2,204 | 308 | 87.75 | 12.25 | 2,530 |
| 25a | 42 | 5 | 2,436 | 220 | 91.72 | 8.28 | 2,674 |
| 26a | 42 | 6 | 2,436 | 264 | 90.22 | 8.78 | 2,718 |
| 27a | 42 | 7 | 2,436 | 308 | 88.78 | 11.22 | 2,762 |
| 28a | 42 | 8 | 2,436 | 352 | 87.39 | 12.61 | 2,806 |
| 29a | 46 | 6 | 2,668 | 264 | 91.00 | 9.00 | 2,950 |
| 30a | 46 | 7 | 2,668 | 308 | 89.65 | 10.35 | 2,994 |
| 31a | 46 | 8 | 2,668 | 352 | 88.35 | 11.65 | 3,038 |
| 32a | 46 | 9 | 2,668 | 396 | 87.09 | 12.91 | 3,082 |
| 33a | 50 | 8 | 2,900 | 352 | 89.18 | 10.82 | 3,270 |
| 34a | 50 | 9 | 2,900 | 396 | 87.99 | 12.01 | 3,314 |
| 35a | 50 | 10 | 2,900 | 440 | 86.83 | 13.17 | 3,358 |
| 36a | 50 | 11 | 2,900 | 484 | 85.70 | 14.30 | 3,402 |
| 37a | 50 | 12 | 2,900 | 528 | 84.60 | 15.40 | 3,446 |
| 38a | 50 | 13 | 2,900 | 572 | 83.52 | 16.48 | 3,490 |
| 39a | 50 | 14 | 2,900 | 616 | 82.47 | 17.53 | 3,534 |
| 40a | 50 | 15 | 2,900 | 660 | 81.47 | 18.53 | 3,578 |

As previously pointed out, having obtained an oxyethylated polypropyleneglycol of the kind described in Table I which is available in the open market, or in the manner described in Table II, or variants thereof provided, of course, they come within the molecular weight limits previously set out, i. e., 2,000 to 6,000, and preferably 2,000 to 4,000, the next step is reaction with chloroacetic acid. The acylchloride may be used but is more expensive.

PART 2

Esters are obtained by the usual esterification procedure involving the diols as described in Part 1 with monochloroacetic acid. The procedure is illustrated by the following examples:

Example 1b

One mole of oxyethylated polypropyleneglycol L-64 (Table I) or 3000 grams was mixed with 1000 grams of xylene in a resin pot with mechanical stirrer and Dean and Stark trap. Two moles of chloroacetic acid or 189 grams were added and the mixture was heated to 180–195° C. to remove by distillation 2 moles of water or 36 grams. Xylene distilling over with the water was separated and returned to the resin pot after removal of the water. A non-viscous amber colored water-emulsifiable liquid resulted.

Further examples are illustrated in Table III, following:

TABLE III

| Ex. No. | Diol[1] | Moles | Grams | Moles chloro acetic acid | Grams | Molar ratio | Temp., °C. | Time, hrs. | Grams H₂O distilled | Moles H₂O distilled | Grams xylene used |
|---|---|---|---|---|---|---|---|---|---|---|---|
| 2b | 40a | 1 | 3,578 | 2 | 189 | 1-2 | 170 | 4½ | 36 | 2 | 1,000 |
| 3b | L-88 | 1 | 3,155 | 2 | 189 | 1-2 | 190 | 3 | 36 | 2 | 1,000 |
| 4b | L-87 | 1 | 3,650 | 2 | 189 | 1-2 | 176 | 8 | 36 | 2 | 1,000 |
| 5b | L-77 | 1 | 3,410 | 2 | 189 | 1-2 | 173-190 | 8 | 36 | 2 | 1,000 |
| 6b | L-74 | 1 | 3,900 | 2 | 189 | 1-2 | 185-190 | 7½ | 36 | 2 | 1,000 |
| 7b | L-84 | 1 | 4,120 | 2 | 189 | 1-2 | 185-190 | 7½ | 36 | 2 | 1,000 |
| 8b | L-62 | 1 | 2,200 | 2 | 189 | 1-2 | 180 | 3 | 36 | 2 | 940 |
| 9b | L-44 | 1 | 2,000 | 2 | 189 | 1-2 | 160-170 | 8 | 36 | 2 | 650 |

[1] Diols identified by number in the "L" series are from Table I; in the small "a" series are from Table II.

PART 3

Having obtained an ester in which there are two chlorinated carboxy radicals obtained by reacting a diol of the kind described in Part 1 with 2 moles of monochloroacetic acid as described in Part 2, such esters are then reacted with pyridine to give a quaternary ammonium compound.

Example 1c

One molecular equivalent of Example 1b, or 4153 grams, was heated under reflux at 160° C. for one hour with 2 moles of pyridine or 158 grams. Upon cooling a homogeneous water-soluble material resulted.

Further examples are illustrated in Table IV following:

TABLE IV

| Ex. No. | Ester used | Molar equiv. | Grams | Grams pyridine | Moles | Molar ratio | Temp., °C. |
|---|---|---|---|---|---|---|---|
| 2c | Ex. 2b of Table III | 1 | 4,731 | 158 | 2 | 1-2 | 160 |
| 3c | Ex. 3b of Table III | 1 | 4,308 | 158 | 2 | 1-2 | 160 |
| 4c | Ex. 4b of Table III | 1 | 4,803 | 158 | 2 | 1-2 | 160 |
| 5c | Ex. 5b of Table III | 1 | 4,563 | 158 | 2 | 1-2 | 160 |
| 6c | Ex. 6b of Table III | 1 | 5,053 | 158 | 2 | 1-2 | 160 |
| 7c | Ex. 7b of Table III | 1 | 5,273 | 158 | 2 | 1-2 | 160 |
| 8c | Ex. 8b of Table III | 1 | 3,293 | 158 | 2 | 1-2 | 160 |
| 9c | Ex. 9b of Table III | 1 | 2,803 | 158 | 2 | 1-2 | 160 |

PART 4

As has been pointed out previously, both the glycols herein described and the esters derived therefrom, are suitable for the resolution of petroleum emulsions.

As to the use of the described glycols, reference is made to the use of conventional demulsifying agents as in U. S. Patent No. 2,626,929, dated January 27, 1953, to De Groote, and particularly to Part 3. Everything that appears therein applies with equal force and effect to the instant process, noting only that where reference is made to Example 13b in said text beginning in column 15 and ending in column 18, reference should be to Example 1c, herein described.

Having thus described our invention, what we claim as new and desire to secure by Letters Patent is:

1. A process for breaking petroleum emulsions of the water-in-oil type, characterized by subjecting the emulsion to the action of a demulsifier including a quaternary ammonium compound of the structure

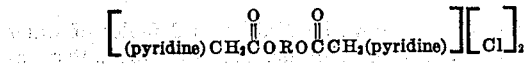

in which ORO is the residue of the oxyethylated polypropyleneglycol $$HO-(C_2H_4O)_x(C_3H_6O)_y(C_2H_4O)_{x'}-H$$

where $(C_3H_6O)_y$ equals approximately 40% to 60%, and $(C_2H_4O)_{x+x'}$ equals approximately 60% to 40% of the total weight of the compound, the molecular weight being within the range of approximately 2,000 to 6,000.

2. A process for breaking petroleum emulsions of the water-in-oil type, characterized by subjecting the emulsion to the action of a demulsifier including a quaternary ammonium compound of the structure

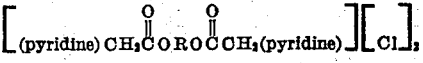

in which ORO is the residue of the oxyethylated polypropyleneglycol $$HO-(C_2H_4O)_x(C_3H_6O)_y(C_2H_4O)_{x'}-H$$

where $(C_3H_6O)_y$ equals approximately 40% to 60%, and $(C_2H_4O)_{x+x'}$ equals approximately 60% to 40% of the total weight of the compound, the molecular weight being within the range of approximately 2,000 to 4,000.

3. The process of claim 2 wherein $(C_3H_6O)_y$ equals approximately 60% and $(C_2H_4O)_{x+x'}$ equals approximately 40%.

4. The process of claim 2 wherein $(C_3H_6O)_y$ equals approximately 55% and $(C_2H_4O)_{x+x'}$ equals approximately 45%.

5. The process of claim 2 wherein $(C_3H_6O)_y$ equals approximately 50% and $(C_2H_4O)_{x+x'}$ equals approximately 50%.

6. The process of claim 2 wherein $(C_3H_6O)_y$ equals approximately 45% and $(C_2H_4O)_{x+x'}$ equals approximately 55%.

7. The process of claim 2 wherein $(C_3H_6O)_y$ equals approximately 40% and $(C_2H_4O)_{x+x'}$ equals approximately 60%.

References Cited in the file of this patent

UNITED STATES PATENTS

| 2,429,997 | De Groote et al. | Nov. 4, 1947 |
| 2,549,437 | De Groote et al. | Apr. 17, 1951 |
| 2,674,619 | Lundsted | Apr. 6, 1954 |